(12) United States Patent
Romanus

(10) Patent No.: US 8,083,845 B2
(45) Date of Patent: Dec. 27, 2011

(54) OBTAINING PROCESS OF ADDITIVATED SODIC BENTONITE FOR USE IN COMPOSITION OF GREEN SAND FOR MOLDING OF CAST PARTS AND RESULTING PRODUCT

(75) Inventor: Arnaldo Romanus, João Pessoa-Paraiba (BR)

(73) Assignee: Coque do Sul do Brasil Ltda, Criciúma-Santa Catarina (BR)

( * ) Notice: Subject to any disclaimer, the term of this patent is extended or adjusted under 35 U.S.C. 154(b) by 152 days.

(21) Appl. No.: 12/445,860

(22) PCT Filed: Oct. 19, 2007

(86) PCT No.: PCT/BR2007/000285
§ 371 (c)(1),
(2), (4) Date: Apr. 16, 2009

(87) PCT Pub. No.: WO2008/046172
PCT Pub. Date: Apr. 24, 2008

(65) Prior Publication Data
US 2010/0294167 A1    Nov. 25, 2010

(30) Foreign Application Priority Data
Oct. 20, 2006   (BR) .................................... 0604327

(51) Int. Cl.
*B22C 1/00*     (2006.01)
*B22C 1/26*     (2006.01)
*B22C 9/02*     (2006.01)
*B22C 9/22*     (2006.01)
*C04B 26/00*    (2006.01)
*C09D 5/20*     (2006.01)

(52) U.S. Cl. ................. 106/38.35; 106/38.2; 106/38.22; 106/483; 106/484; 106/487; 106/807; 106/811; 106/DIG. 4

(58) Field of Classification Search ............... 106/38.35, 106/483, 484, 487, 807, 811, DIG. 4, 38.2, 106/38.22
See application file for complete search history.

(56) References Cited

U.S. PATENT DOCUMENTS
4,203,771 A    5/1980   Matsui
4,867,228 A    9/1989   Novelli et al.

FOREIGN PATENT DOCUMENTS
JP        61037345        2/1986

OTHER PUBLICATIONS

Office Action issued by Canadian Patent Office on Apr. 6, 2011 regarding Application No. 2,657,799 in the name of Coque Do Sul Do Brasil Ltda.

*Primary Examiner* — Anthony Green
(74) *Attorney, Agent, or Firm* — B. Aaron Schulman, Esq.; Stites & Harbison, PLLC

(57) ABSTRACT

Composition and process of a composition of additivated sodic bentonite through the addition of dextrin and sugar (saccharose), preferably refined sugar, or starch and sugar (saccharose), preferably refined sugar, in specific quantities during the process of calcic bentonite activation by means of incorporation of sodium carbonate into the in natura ore, belonging to the field of chemical industry for use in the composition of green sand for cast molding, offering a wide range of advantages in comparison with the existing formulas.

12 Claims, No Drawings

OBTAINING PROCESS OF ADDITIVATED SODIC BENTONITE FOR USE IN COMPOSITION OF GREEN SAND FOR MOLDING OF CAST PARTS AND RESULTING PRODUCT

FIELD OF THE INVENTION

The present invention relates to processes for obtaining a composition of additivated sodic bentonite.

BACKGROUND OF THE INVENTION

Traditionally the use of calcic or pure sodic bentonite is known in the composition of green sand for use in metal casting, where its function is to confer mechanical properties to the mold, especially a high plasticity and a low friability, thus avoiding occurrences of mold breaking or their erosion during the metal pouring process.

It is a fact that along the last years and as a result of the exacerbate use of natural resources, sodic bentonite, be it natural or activated, does not offer a reasonable purity level anymore, and this factor is interfering with the quality of green sand used for elaboration of foundry molds and consequently with the quality of the obtained castings. For this reason, the additivation of the bentonite has become necessary in order to achieve better technical results and to improve production, aiming at minimizing and even reducing such inconveniences.

Just for the purpose of better understanding in relation to the state-of-the-art, the green sand, an indispensable composition for use in casting, is composed of the mixture of variable portions of silica sand, clay, known as bentonite, water and mineral coal powder, also known as Cardiff powder.

This compound has been known for many years in foundry and used in conventional casting as well as in high productivity molding machines and, for this purpose, it needs a sufficiently high compactability in order to assure an excellent plasticity of the molds, thus avoiding their breakage resulting from excessive heat of the molten metal and during the mold extraction.

The present invention provides a composition of sodium bentonite, obtained through addition of starch and sugar additives or dextrin and sugar, specifically during the transformation process of calcium bentonite into sodium bentonite, together with the incorporation of sodium carbonate into the natural ore.

Therefore, the green sand must not present a high moisture level, and the biggest problem currently faced for obtaining a green sand having both high compactability as well as low moisture is the fact that such characteristics are directly proportional, and in most cases their adjustment cannot be achieved by simply modifying the addition of one of the mixture components.

Thus, there are several alternatives to be adopted by foundries for obtaining a green sand composition having good compactability and moisture rates, and one of those alternatives is by means of using additivated bentonite which is the subject matter of the present patent.

It is important to explain that the sodic bentonite, resulting from the activation through sodium carbonate, must present a high thermal stability, high swelling level and the highest possible wet tensile strength and green compression strength of the molding sand, such characteristics resulting from the fact that the ore presents a high methylene blue adsorption rate.

Now it has turned out that the Brazilian layers which contained such ore with high methylene blue adsorption have virtually run out and, due to this fact, it will be necessary to search for efficient alternatives as substituting elements in the composition of green sand in order to assure the plasticity of casting molds.

SUMMARY OF THE INVENTION

The present invention relates to the obtaining process of a composition of additivated sodic bentonite through the addition of dextrin and sugar (saccharose), preferably refined sugar, or starch and sugar (saccharose), preferably refined sugar, in specific quantities, during the process of the calcic bentonite activation, by means of incorporation of sodium carbonate into the in natura ore, technically denominated montmorillonitic clay.

Both processes and resulting products belong to the field of chemical industry and their purpose is supplying the market with a clay or additivated bentonite for use in composition of green sand for cast molding, offering a wide range of advantages in comparison with the prior art.

The present invention proposes a specific technical development to obtain the bentonite for use in the composition of green sand which aims at satisfying the needs and demands required by the market pertinent to the issue. The bentonite product of the present invention provides more efficiency and quality at the preparation of foundry molds for a variety of metallic parts, avoiding the occurrence of breakage of said molds as well as sintering of the cast parts, resulting from the necessity of increasing the moisture of sand and the other components, reducing costs and avoiding excessive disposal of pollutant material in the environment.

This way, the main purpose of using the additivated bentonite in green sand is the reduction of rejected cast parts, besides providing other additional gains for foundries, which may consist of reducing the occurrence of mold breakage during extraction and at the metal pouring process, as well as reducing the burr removal process due to improved parts finishing.

The present invention seeks to provide an additivated sodic bentonite for use in composition of green sand for molding of car parts, comprising: in natura sodic bentonite and an addictive selected from: dextrin and sugar, and starch and sugar; wherein the additive is added during the process of transforming calcic bentonite into sodic bentonite when incorporating the sodium carbonate into the in natura sodic bentonite.

The present invention also seeks to provide a process for obtaining an additivated sodic bentonite for use in composition of green sand for molding of car parts, the process comprising incorporating sodium carbonate into in natura sodic bentonite with an additive selected from: dextrin and sugar, and starch and sugar; transforming calcic bentonite into sodic bentonite.

DETAILED DESCRIPTION OF THE INVENTION

The purpose of the present invention idealizes a composition of additivated sodic bentonite, obtained through addition of starch and sugar (saccharose), preferably refined sugar, additives or dextrin and sugar (saccharose), preferably refined sugar, specifically during the transformation process of calcic bentonite into sodic bentonite, together with the incorporation of sodium carbonate into the in natura ore.

We are called upon to emphasize that the condition of adding the additivated bentonite in question to the green sand mixture is established according to criteria and parameters of correction elaborated in compliance with the ore types that manufacturers consider more appropriate.

This way, the additives used may consist of the combination of dextrin and sugar (saccharose), preferably refined sugar, or the combination of starch and sugar (saccharose), preferably refined sugar, where the quantity of such additives will depend on the needs, especially of the materials already used at the initial pattern making in the foundries that are using the described product, since their needs will result from the conditions of analysis of the molding sand.

The ideal mixture for obtaining additivated bentonite through dextrin and sugar (saccharose), preferably refined sugar, is defined as: Dextrin between 3 (three) and 30% (thirty percent), preferably 10% (ten percent); and Refined sugar (saccharose) between 0.1 (one tenth) and 25% (twenty-five percent), preferably 5% (five percent).

The ideal mixture for obtaining additivated bentonite through starch and sugar (saccharose), preferably refined sugar, is defined as: Starch between 5 (five percent) and 35% (thirty-five percent), preferably 15% (fifteen percent); and Refined sugar (saccharose) between 0.1 (one tenth) and 25% (twenty-five percent), preferably 5% (five percent).

Finally, even when using the best types of pure bentonites and mineral coal powder that currently exist, and also establishing a correct control of the most important variables for green sand (such as optimized efficiency of mixture, exhaustion adjustment of inert fines and use of return sand at low temperature), there is a critical increase of problems that did not exist a few years ago, due to the run out of known bentonite layers in Brazil and Argentina, containing bentonite with a very high methylene blue adsorption rate.

Therefore, and since the suppliers have a laboratory for properly assessing the green sand for foundries, they will have the conditions for preparing bentonites that compensate the purity decrease, with a special focus on a higher plasticity and reduced friability of that molding sand, as well as a lesser metal oxidation while pouring into the molds, being sufficient the use of the methodology for obtaining the additivated bentonite as revealed hereunder.

The invention claimed is:

1. A bentonite composition containing additives for use with green sand for molding of car parts, comprising:
   natural sodium bentonite, and
   an additive selected from the group consisting of: dextrin and sugar, and starch and sugar.

2. The bentonite composition containing additives according to claim 1, wherein the dextrin is incorporated into the bentonite at a concentration ranging from 3.0% to 30.0% and the sugar is incorporated into the bentonite in a concentration ranging from 0.1% to 25%.

3. The bentonite composition containing additives according to claim 1, wherein the dextrin is incorporated into the bentonite at a concentration of 10.0% and the sugar is incorporated into the bentonite at a concentration of 5.0%.

4. The bentonite composition containing additives according to claim 1, wherein the starch is incorporated into the bentonite in a concentration ranging from 5.0% to 35.0% and the sugar is incorporated into the bentonite in a concentration ranging from 0.1% to 25%.

5. The bentonite composition containing additives according to claim 1, wherein the starch is incorporated into the bentonite at a concentration of 15.0% and the sugar is incorporated into the bentonite at a concentration of 5.0%.

6. The bentonite composition containing additives according to claim 1, wherein the sugar is refined sugar.

7. A process for obtaining a sodium bentonite composition containing additives for use with green sand for molding of car parts, the process comprising:
   (a) providing natural calcium bentonite;
   (b) incorporating sodium carbonate into the natural calcium bentonite, transforming natural calcium bentonite into natural sodium bentonite;
   (c) incorporating an additive selected from the group consisting of dextrin and sugar, and starch and sugar into the natural sodium bentonite;
   (d) obtaining the sodium bentonite composition containing additives.

8. The process according to claim 7, wherein the dextrin is incorporated into the bentonite in a concentration ranging from 3.0% to 30.0% and the sugar is incorporated into the bentonite in a concentration ranging from 0.1% to 25%.

9. The process according to claim 7, wherein the dextrin is incorporated into the bentonite at a concentration of 10.0% and the sugar is incorporated into the bentonite at a concentration of 5.0%.

10. The process according to claim 7, wherein the starch is incorporated into the bentonite in a concentration ranging from 5.0% to 35.0% and the sugar is incorporated into the bentonite in a concentration ranging from 0.1% to 25%.

11. The process according to claim 7, wherein the starch is incorporated into the bentonite at a concentration of 10.0% and the sugar is incorporated into the bentonite at a concentration of 5.0%.

12. The process according to claim 7, wherein the sugar is refined sugar.

* * * * *